March 20, 1956  L. A. WILLYARD ET AL  2,738,757
FREQUENCY DISPLAYS FOR A RADIO RECEIVER OR THE LIKE
Filed July 23, 1954  2 Sheets-Sheet 1
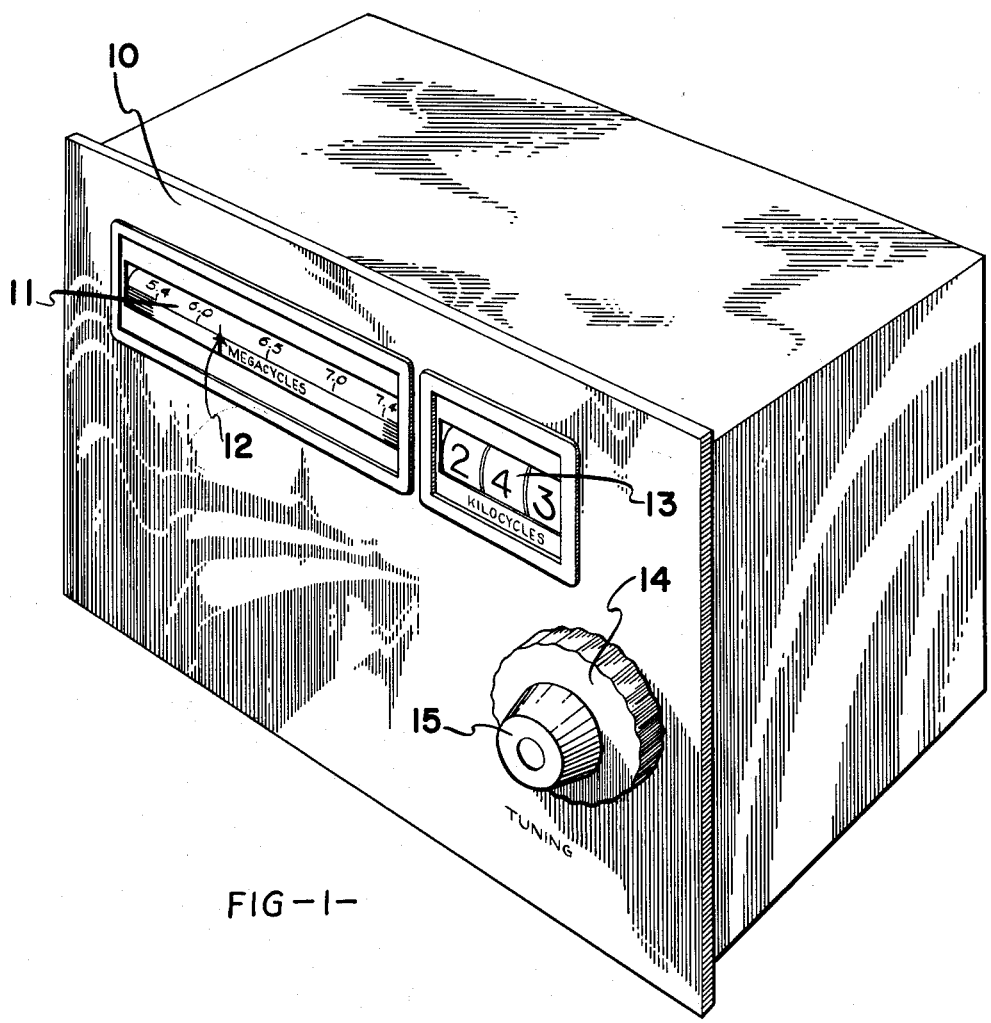
FIG-1-
LESLIE A. WILLYARD
CHARLES L. VICE
JAMES P. ARMSTRONG
LUDWIG P. REICHE
*INVENTORS*
BY
THEIR ATTORNEY

March 20, 1956 L. A. WILLYARD ET AL 2,738,757
FREQUENCY DISPLAYS FOR A RADIO RECEIVER OR THE LIKE
Filed July 23, 1954 2 Sheets-Sheet 2
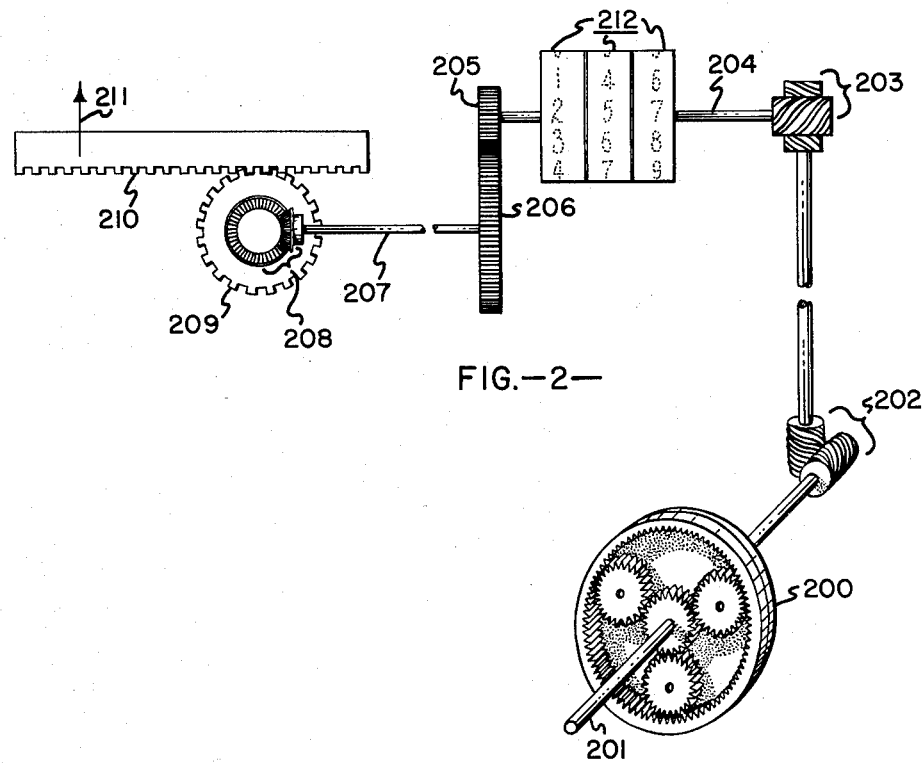
FIG.—2—
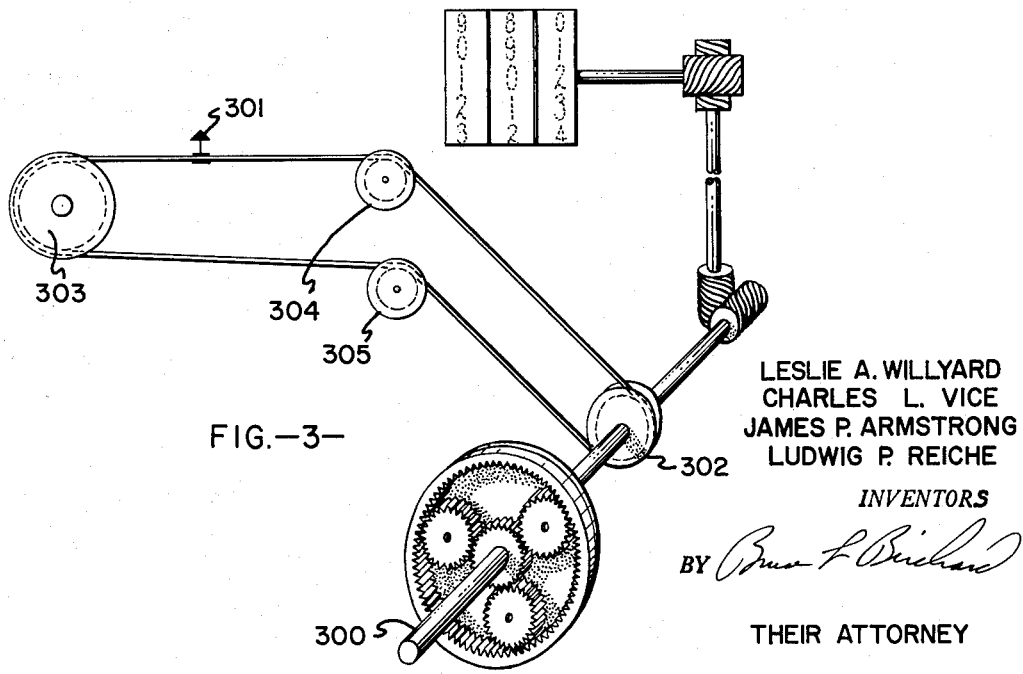
FIG.—3—
LESLIE A. WILLYARD
CHARLES L. VICE
JAMES P. ARMSTRONG
LUDWIG P. REICHE
INVENTORS
BY
THEIR ATTORNEY

United States Patent Office 2,738,757
Patented Mar. 20, 1956

2,738,757

FREQUENCY DISPLAYS FOR A RADIO RECEIVER OR THE LIKE

Leslie A. Willyard, Inglewood, Charles L. Vice, San Marino, and James P. Armstrong and Ludwig P. Reiche, Los Angeles, Calif., assignors to Hoffman Electronics Corporation, a corporation of California Application July 23, 1954, Serial No. 445,344

1 Claim. (Cl. 116—124.1)

This invention is related to frequency displays for radio receivers and, more particularly, to an improved frequency display which will lend itself to ease of observation by the operator.

Frequency displays for radio receivers presently in use are undesirable in some respects. The analog type of display has the advantage of allowing the operator to sense intuitively the direction in which he is tuning (by reason of the direction of motion of the indicator across the conventional calibrated scale), but possess a serious disadvantage in that the operator may not determine with any accuracy the exact frequency at which the receiver is tuned. ("Analog" displays are to be understood to include all such displays regardless of whether the dial is calibrated linearly, logarithmically, etc., and regardless of whether the pointer is movable or fixed.) On the other hand, receivers having a digital display system allow the operator to read directly and with high precision the frequency of the receiver at a particular setting; however, when tuning the receiver the operator must tune slowly at first in order to discover in which direction (from the standpoint of frequency) the receiver is being tuned.

Therefore, it is an object of this invention to provide an improved frequency display for a radio receiver.

It is a further object of this invention to provide an improved frequency display for a radio receiver in which the respective advantages of analog and digital displays are incorporated and the disadvantages of the analog and digital displays are eliminated.

It is an additional object of this invention to provide an improved frequency display for a radio receiver which will be very simple, compact, and operationally error-proof, while at the same time permitting great flexibility in the tuning mechanism employed.

According to this invention, a frequency display is employed in which an analog indicator and a digital indicator are intercoupled through an appropriate mechanism to describe the complete frequency reading. Accordingly, there results a display of the exact frequency at any particular dial setting; in addition, the operator senses intuitively the "direction" in which he is tuning the receiver.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings, in which:

Figure 1 is an elevational view of a receiver employing a combined analog and digital frequency display, according to this invention.

Figure 2 is a sketch of a representative gear train designed for intercoupling the two frequency displays of the receiver.

Figure 3 is a representation of a second means for intercoupling the frequency displays of the receiver.

In Figure 1, receiver 10 has a frequency display consisting of analog dial 11, and its associated indicator 12, and digital display 13. Digital display 13 is of conventional type, having a plurality of discs the outer peripheries of which include consecutive numerals appropriately spaced. Suppose, for example, that the receiver is designed to operate in a frequency range above 1 megacycle. Then, indicator 12 would serve as a rough indication of the frequency in megacycles, while, simultaneously, digital display 13 would serve as an exact indication of the number of kilocycles above the integral megacycle reading to which the receiver is tuned. It is to be noted that, at any particular dial setting, the frequency of the receiver in kilocycles may be determined exactly by virtue of digital display 13. If the operator desires to change the frequency of the receiver, he turns the tuning control knob. While this will instantly cause the high-resolution counter display to appear as an illegible blur, the operator can sense the direction of his tuning by noting the analogous movement of indicator 12. Upon turning either coarse-tuning control 14 or fine-tuning control 15, displays 11 and 13 are simultaneously activated to produce a complete frequency reading. While shown as concentric fine-tuning and coarse-tuning controls, control knobs 14 and 15 may be of any conventional type. Further, the receiver may be limited to one control knob; or, tuning may be motor driven.

In practice, any number of analog dials may be employed together with a band switch to be switched in by the operator as desired. Also, digital display 13 may incorporate any number of digital discs. As is well known to the art, there are many types of gear trains which will suffice to achieve the desired result, namely, to effect a frequency display the approximate integral frequency of which may be determined from the analog reading and the exact frequency of which may be determined by adding a digital reading. The invention consists solely in the novelty of using a conventional analog type display and a conventional digital display to achieve a novel result, that is, to provide for the operator means for accurately determining the frequency of the receiver at a particular setting while at the same time assisting the operator in rapidly locating approximate settings and in determining instantly and intuitively the direction in which the receiver is being tuned.

Representative of gear combinations which may be employed to intercouple the frequency displays of the receiver to each other and to the tuning apparatus associated therewith are the embodiments shown in Figure 2 and Figure 3.

In Figure 2 fine tuning planetary gear device 200 is mounted upon tuning shaft 201 the direction of rotational motion of which is translated through 45° helical gear sets 202 and 203 to countershaft 204. Spur gear 205 is mounted upon countershaft 204 and cooperates with spur gear 206 which is mounted upon shaft 207. Bevel gear set 208 translates the rotational motion of shaft 207 in order to drive pinion gear 209 which in turn cooperates with rack 210. To rack 210 is mounted pointer 211 which completes the analog-type frequency display.

From Figure 2 it is easily seen that the rotation of tuning shaft 201 is accompanied by the translational motion of rack 210 and hence of pointer 211. The motion of pointer 211 will be accompanied by the simultaneous rotational displacement and setting of counterdials 212. The operation and intercoupling of counterdials 212 is well known to the art and requires no detailed explanation.

The frequency display intercoupling mechanism shown in Figure 3 is identical with that of Figure 2 with the exception that the rotational motion of tuning shaft 300 is processed into translational motion of analog display pointer 301 by means of pulley 302 (mounted upon shaft 300) and pulley 303, and by idler wheels 304 and 305. From a practical standpoint the configuration shown in Figure 3 will be much less expensive to manufacture than the rack and pinion gear assembly and associated gear train exemplified by the coupling embodiment described in Figure 2 and the discussion relating thereto.

The techniques for intercoupling the two frequency displays and tuning apparatus as suggested by the embodiments shown in Figure 2 and Figure 3 are representative only; numerous equivalent structures may be employed in lieu of either with equal effectiveness.

In order for the receiver to incorporate the frequency display as herein described, it must, of course, be equipped with a tuning system having both a high degree of linearity (frequency vs. shaft rotation) and high resolution. A further implied requirement is that the receiver have high frequency stability, commensurate with its high resolution.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

We claim:

In combination, an analog-type frequency display including a pointer movable transversely in either of two opposite directions and a digital-type frequency display, said analog-type display being calibrated in intervals of greater frequency increments than said digital-type display, a rotatable shaft coupled to said digital-type display, rotatable tuning means coupled to said rotatable shaft, and means intercoupling said pointer with said tuning means for translating said pointer in accordance with the rotation of said tuning means and said shaft, said displays thereby jointly serving to present an accurate frequency indication.

References Cited in the file of this patent

UNITED STATES PATENTS

| | | |
|---|---|---|
| 1,373,442 | Meitner | Apr. 5, 1921 |
| 1,526,538 | Ford | Feb. 17, 1925 |
| 2,361,572 | Smith | Oct. 31, 1944 |
| 2,530,541 | Roth | Nov. 21, 1950 |